Sept. 24, 1935.  C. DELL ET AL  2,015,300
POWER TRANSMISSION SYSTEM
Filed July 17, 1934  2 Sheets-Sheet 2

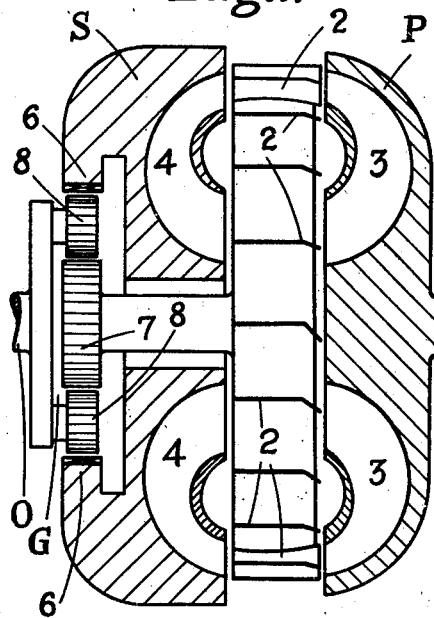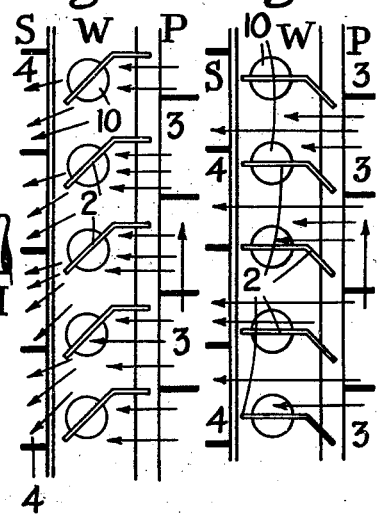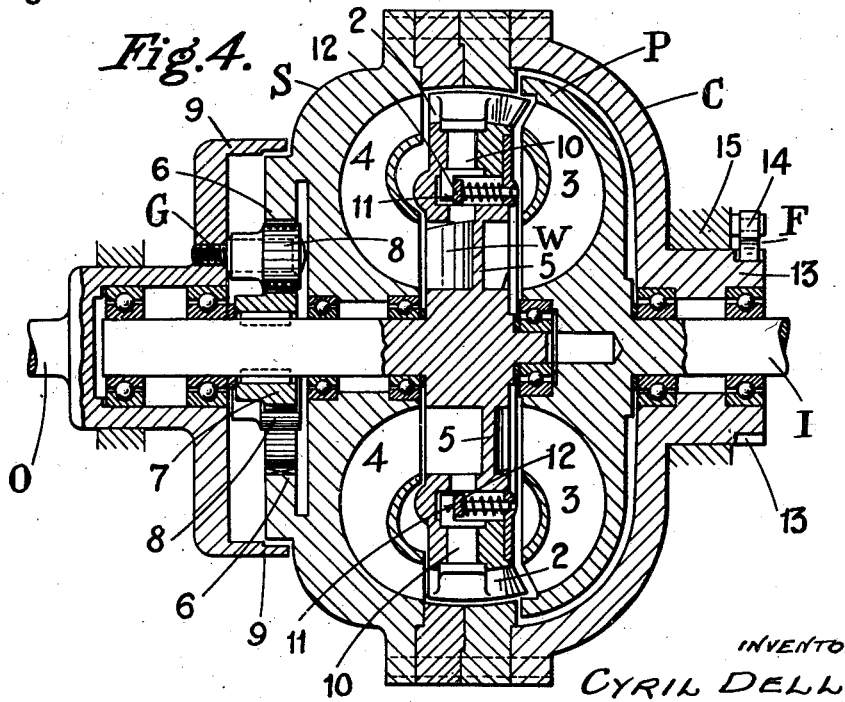

INVENTORS
CYRIL DELL,
HERBERT L. READ,
By Carroll Bailey
ATTY.

Patented Sept. 24, 1935

2,015,300

UNITED STATES PATENT OFFICE 2,015,300

POWER TRANSMISSION SYSTEM

Cyril Dell, Berkhamsted, and Herbert Louis Read, Herington Grove, Hutton Mount, England Application July 17, 1934, Serial No. 735,684
In Great Britain February 28, 1933

9 Claims. (Cl. 74—293)

This invention relates to power transmission systems i. e. devices adapted to be interposed between an input and output shaft for the purpose of transmitting power or drive from the former to the latter, and has for its object to provide a device of this character embodying a fluid coupling employing the kinetic energy of the working fluid for transmitting power (i. e. of the Föttinger type) and a change speed device infinitely and automatically variable under varying power and load conditions obtaining on the input and output shaft respectively.

In its broad aspect the invention provides a power transmission device comprising a fluid coupling having its primary member operatively connected to the input shaft and its secondary member operatively connected to one member of an epicyclic or differential system. In combination there is a vane wheel interposed between the primary and secondary members of the fluid coupling, and operatively connected to another member of the same epicyclic or differential system, whilst the output shaft is connected to the third or remaining member of the epicyclic or differential system. Thus, instead of a simple hydraulic coupling transmitting primary torque direct to the output shaft, there is introduced an intermediate member intergeared with the secondary of the coupling and with the output shaft, and on this intermediate member the force of the primary torque is at first concentrated with a resultant geared down initial dive on the output shaft; this continues while the output shaft speeds up and eventually the relationship of load to primary torque permits the secondary of the coupling to take a share of the primary torque and further increase the speed of the output shaft.

The gearing is for most practical purposes an epicyclic system, and when this latter is utilized the secondary member of the fluid coupling is preferably operatively connected to the annulus of the epicyclic system, the vane wheel to its sun and the output shaft to the planet carrier. The foregoing defines what are commonly and herein referred to as the three members of an epicyclic system, whilst the equivalents in a differential gear are the rotary cage carrying its two pinions and the remaining two independent pinions.

The phrase vane wheel includes any suitable form of spoked, vaned, celled, or equivalent rotary element which may be interposed between the primary and secondary fluid coupling members so as to receive between or through its vanes or equivalents the fluid columns pumped by the primary member.

An embodiment of the invention will be described in greater detail with the aid of the accompanying drawings wherein:—

Figures 1–3 are diagrams referred to later;

Figure 4 is a longitudinal section of the apparatus;

Figure 5:
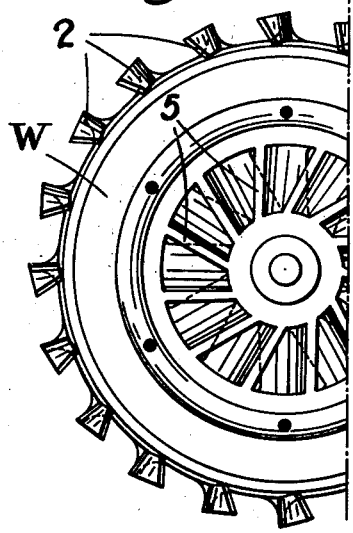
Figure 5 is a face view of part of the vane wheel.
Figure 6:
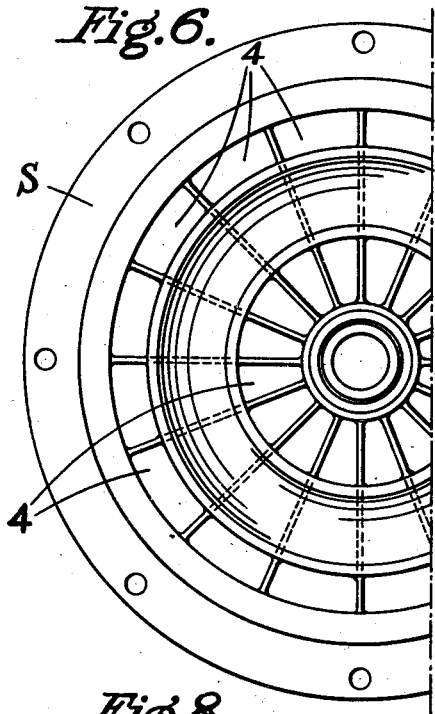
Figure 6 is a similar view of part of the secondary coupling element.
Figure 7:
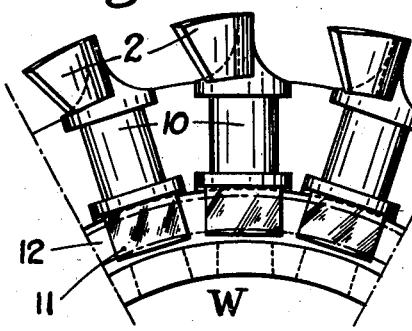
Figures 7, 8 and 9 are respectively front view, vertical section and plan of a fragment of the vane wheel at its periphery (drawn to a larger scale).

Referring firstly in a general manner to the drawings, the primary and secondary members of the fluid coupling are designated P and S respectively, the interposed vane wheel W, whilst the epicyclic gear as a whole is denoted by the reference G. The input and output shafts are designated I and O respectively. For the rest the casing C is fixedly carried by the secondary member S, and F indicates a free-wheel device of any suitable form.

The interposed wheel W is provided with vanes 2 on its periphery, and the columns of fluid pumped by the primary member P from the cells 3 pass between these vanes to the cells 4 of the secondary member S returning via the skew conduits between the webs 5 of the vane wheel W. These webs 5 may lie in true radial planes containing the axis of the whole system, or may be replaced by spokes.

The primary member P is formed integral with or otherwise operatively connected to the input shaft I, and the secondary member S is integral with the annulus 6 of the epicyclic gear G. The vane wheel W is adapted to rotate the sun wheel 7 of the epicyclic gear, and the planets 8 of the gear are mounted on a carrier 9 adapted to drive the output shaft O.

On the primary member P being rotated, the fluid issuing from the cells 3 will endeavour to carry round the interposed vane wheel W, as well as the secondary S of the coupling. Assuming a load on the output shaft O (which, it will be remembered, is connected to the planet carrier 9) it will be more difficult to carry round the secondary of the coupling than the interposed vane wheel because the ratio between the secondary and the planet carrier 9 to which the load on the output shaft is applied is larger than that between the sun and the planet carrier so that consequently the effective load on the secondary of the coupling is greater than on the vane wheel.

The primary driving torque is consequently mainly spent on the intermediary member, viz. the said interposed vane wheel W.

For this reason the vane wheel will begin to go round with the primary (with slip depending on the speed of the primary) and the sun 7 of the epicyclic system will begin to rotate causing the planet carrier 9 and therewith the output shaft O to rotate in the same direction but at a reduced speed, owing to the fact that the annulus 6 is still stationary due to the higher load obtaining thereon. Practically the full force of the transmitting torque is concentrated on rotating the vane wheel W.

But the load is now gradually reduced as the speed of the output shaft O increases, with a corresponding load reduction on the annulus 6 and on the secondary S of the fluid coupling to which it is connected, so that the primary P will begin to rotate the secondary S and with it the annulus 6 of the epicyclic system G. As the speed of the annulus 6 increases with the further decrease of the load it will itself rotate the planet carrier 9 and therewith the output shaft with increasing speed, until finally the speed of the annulus 6 attains that of the sun 7 (discounting slip in the coupling). When this stage is reached all members of the epicyclic system rotate together and the speed of the output shaft will be the same as that of the input shaft, i. e. a one to one drive is obtained.

Summarizing the above, the speed of the output shaft is automatically increased from zero to the speed of the input shaft as the load on the former decreases, that is to say, the variation of load is accompanied by a requisite gear ratio change automatically determined by the load; consequently the torque can be regarded constant for all practical purposes. A power transmission device constructed on the above broad principle is therefore an infinitely variable automatic torque converter or change speed device, embodying an automatically acting fluid clutch.

The efficiency of the device described above can be considerably increased by the following means.

Figure 8:
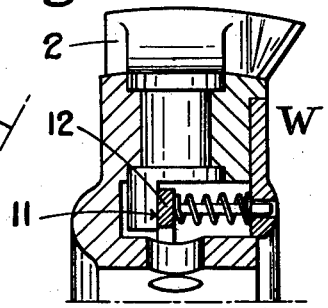
Figure 9:
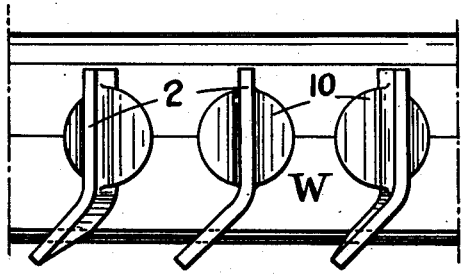

The vanes 2 of the vane wheel W are rotatably mounted on radial studs 10 and are spring urged into axial position. For example, the flats 11 on the respective inner ends of the studs 10 may lie against a spring-loaded ring 12 (Figure 8) which tends to resist rotation of the studs. The secondary S and the annulus 6 of the planetary system connected thereto are prevented from reverse rotation by the interposed free wheel device F or quivalent.

With this arrangement the vanes 2 will be turned from their normal axial position (all figures excepting Figure 2) into a forwardly inclined position (Figure 2) by the force of the fluid issuing axially from the primary member of the fluid coupling when the input shaft begins to rotate. The fluid, guided backwards by the inclined vanes 2 at an angle relatively to the direction of rotation as depicted by the arrows in Figure 2 will impinge upon the walls of the cells 4 of the secondary S but cannot rotate this backwards owing to the action of the free wheel F and will therefore react upon the vanes, thus helping to drive the vane wheel W forward. Since the vane wheel is connected to the sun 7 of the epicyclic system G, this will considerably assist in picking up the load. It will be seen that the vane wheel W now acts as the rotor of an impulse reaction turbine, the secondary S of the coupling constituting the stator. This will continue until the action of the fluid columns issuing from the primary P on the vane wheel is eased by the speed of the vane wheel approaching that of the primary P, when the vanes 2 again gradually straighten up. In this condition the fluid columns follow the substantially axial path depicted by the arrows in Figure 3. The angular position of the rotatable vanes 2 will, of course, depend upon difference of speed between the intermediary W and primary P, i. e. the power and load conditions and will continuously vary with variation of these. At one to one drive the position of the vanes will be axial or substantially axial The aforesaid movable vanes 2 may be formed streamlined on the well known turbine blade principle with such modifications as will best suit their particular conditions of operation in the present device. In the embodiment illustrated they have been given a bent leading edge inclined backwardly from the direction of rotation of the wheel W.

The invention also includes a construction wherein a plurality of vane wheels is interposed between the primary and secondary members of the fluid coupling, the second, fourth, etc. vane wheels having non-rotatable vanes and acting as stators during the impulse reaction turbine action. These "stator" vane wheels may be coupled together or not and may be collectively or individually prevented from reverse rotation by one or more free wheel devics.

Any suitable reverse gear may be incorporated with the power transmission system according to the invention and neutral position may be provided between the forward and reverse drive. Such neutral and reverse gears are well known in the art and as they do not form part of the invention they need not be described here in detail.

The pivotal axes respectively of the rotatable vanes (i. e. the axes of the studs 10) are preferably located out of centre with regard to the length of the blades from leading edge to tail, in such a manner that the blades are unbalanced with a greater length towards the leading edge (i. e. in the direction of the primary element of the fluid coupling).

The free wheel device F hereinbefore referred to for preventing reverse rotation of the secondary of the coupling may be interposed between the secondary S or any part fixedly rotating therewith on the one hand and any relatively fixed part on the other hand. For example, in Figure 4 it will be observed that one element of the free wheel (e. g. the toothed ring 13) is carried by the casing C which is fast with the secondary S, whilst the other free wheel element (e. g. the pawl or pawls 14) is carried by an outside fixture such as a bracket 15. Further, means may be incorporated to render the said free wheel ineffective as and when desired, because in certain circumstances it may be found useful to permit the reverse rotation of the secondary and annulus. For example, the retrogressive movement of the annulus will allow the load to be picked up very slowly and enable the full torque of the engine to be developed before a drive is transmitted to the planetary system. In this respect the relatively fixed part of the free wheel device may be held by a band or other brake releasable at will.

We claim:

1. A power transmission device comprising a differential gear having a primary, a secondary and a tertiary member, a fluid coupling including a power driven primary element, a secondary element and a vane wheel, the latter being interposed between said primary and secondary elements to be acted upon by fluid issuing from the driven primary element prior to the fluid acting upon the secondary element, a torque transmitting connection between the secondary element of the coupling and one of the members of the differential gear, a torque transmitting connection between the vane wheel and another of the members of the gear, and a driving connection between the third member of the gear and the load, the primary element of the fluid coupling being adapted to drive the differential gear solely through the fluid of the coupling.

2. A power transmission device as set forth in claim 1 in which the differential gear is of the epicyclic type.

3. A power transmission device as set forth in claim 1 in which the vane wheel includes vanes rotatable about radial axes, and in which spring means hold said vanes in normal positions and resist rotation thereof about their own axes by the fluid acting thereagainst.

4. A power transmission device as set forth in claim 1 in which the vane wheel includes vanes having radially inwardly extending pivot elements, in which said pivot elements are provided with flat sides, and in which a spring pressed ring engages the flat sides of said pins to hold them in normal positions and to resist rotation thereof under the influence of fluid acting against the vanes.

5. A power transmission device as set forth in claim 1 in which the vane wheel includes vanes rotatable about radial axes, in which spring means resist rotation of said vanes about their own axes by fluid acting against the vanes, and in which the pivotal axes of said vanes are disposed nearer to their tail ends than to their leading edges.

6. A power transmission device as set forth in claim 1 including means to hold the secondary element of the fluid coupling against reverse rotation.

7. A power transmission device as set forth in claim 1 including means to hold the secondary element of the fluid coupling against reverse rotation and capable of being rendered inoperative at will.

8. A power transmission device as set forth in claim 1 in which the primary and secondary elements and the vane wheel of the fluid coupling are axially alined, in which the differential gear is of the epicyclic type including sun, annulus and planetary members, in which the secondary element of the fluid coupling is connected with the annulus member, in which the vane wheel is connected with the sun member, and in which the planetary member is connected to the load.

9. A power transmission device as set forth in claim 1 in which the secondary of the fluid coupling is connected with the load solely through the differential gear.

CYRIL DELL.
HERBERT LOUIS READ.